No. 785,642. PATENTED MAR. 21, 1905.
J. J. STOPPLE.
BALING PRESS.
APPLICATION FILED NOV. 4, 1903.
4 SHEETS—SHEET 1.
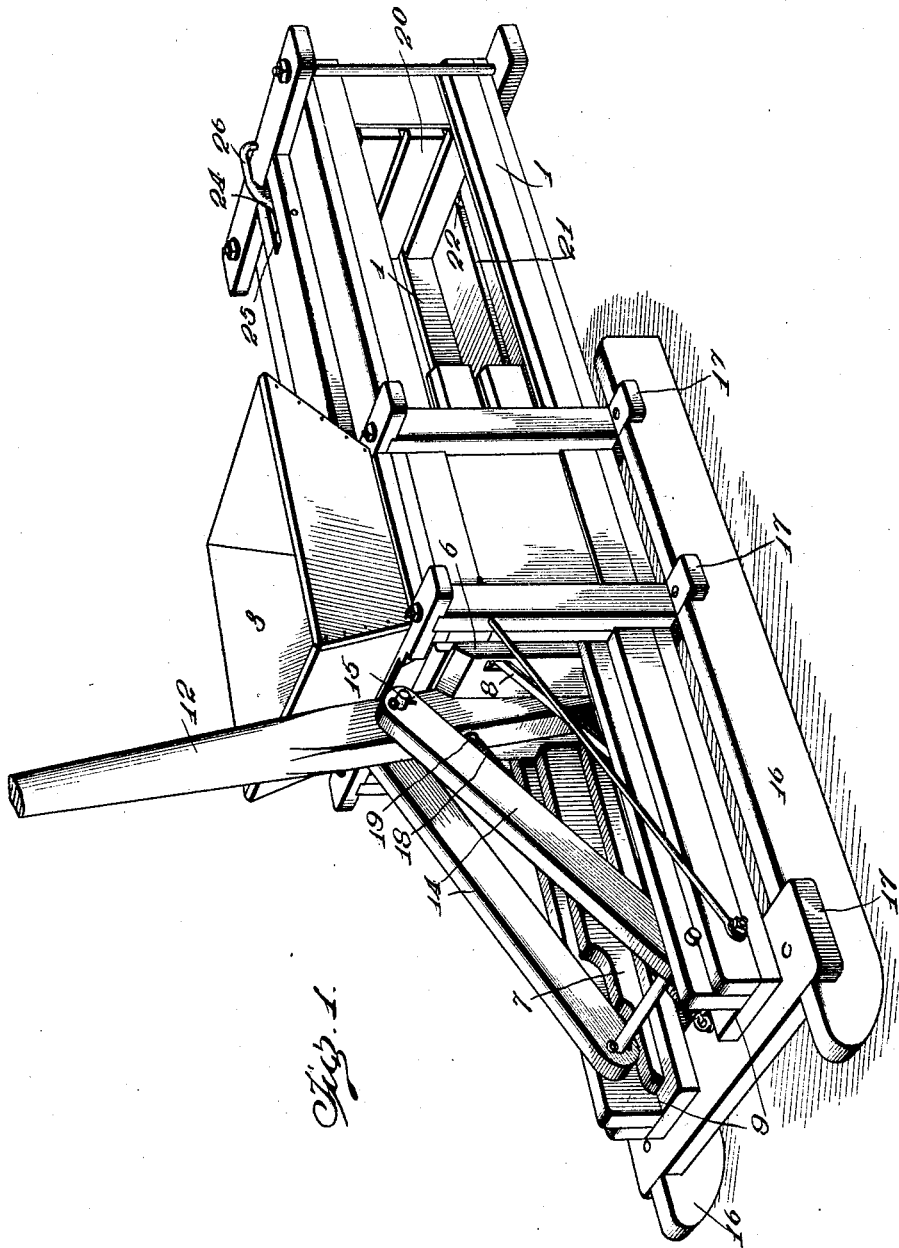
Witnesses
Inventor
John J. Stopple,
By
Attorneys

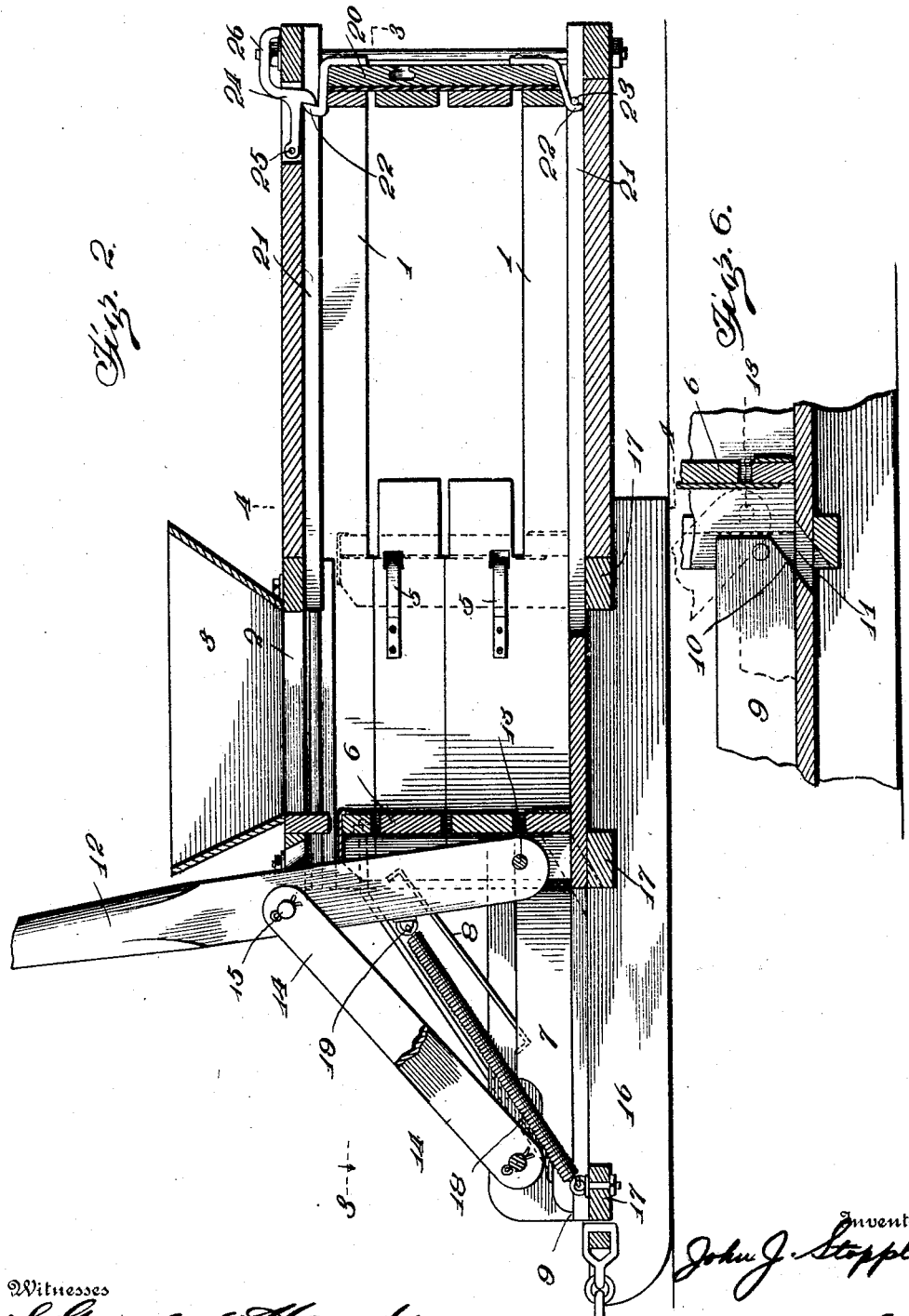

No. 785,642. PATENTED MAR. 21, 1905.
J. J. STOPPLE.
BALING PRESS.
APPLICATION FILED NOV. 4, 1903.
4 SHEETS—SHEET 3.
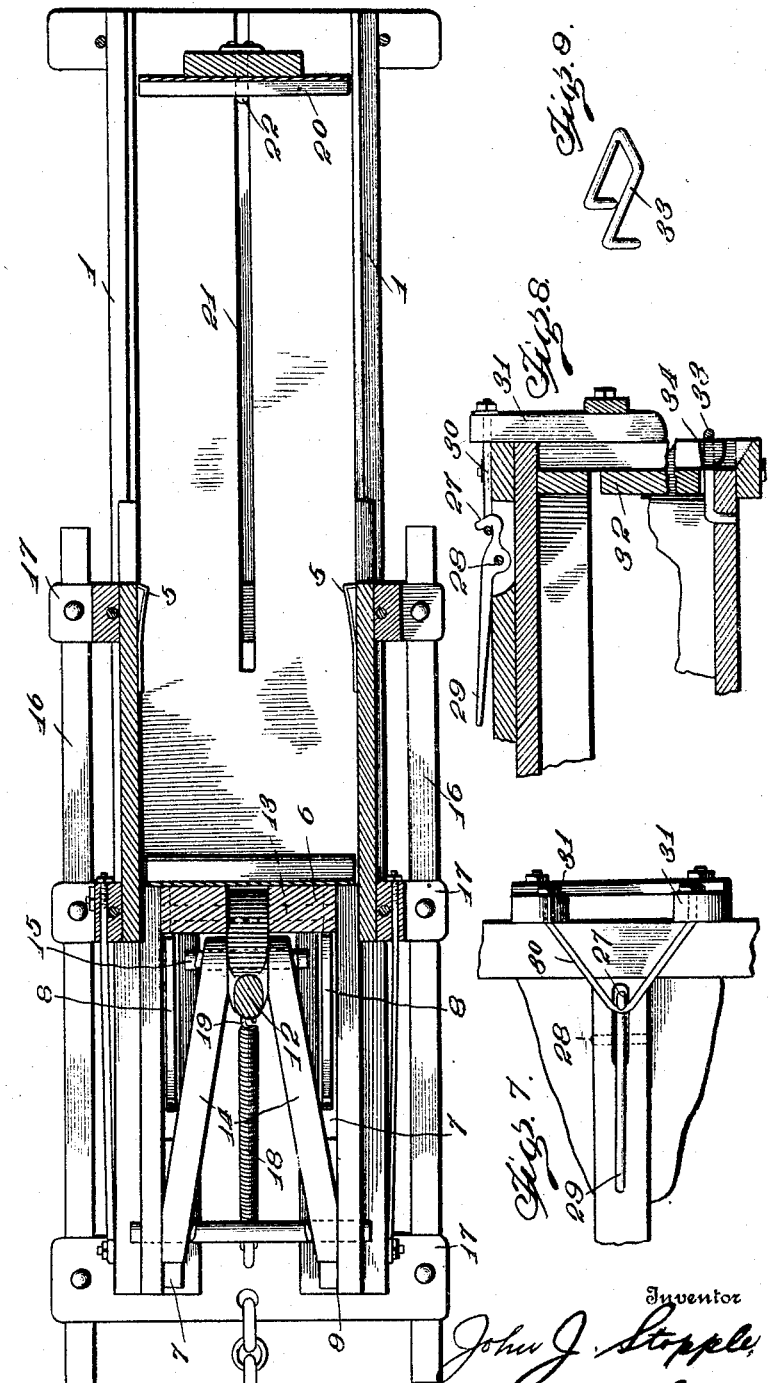

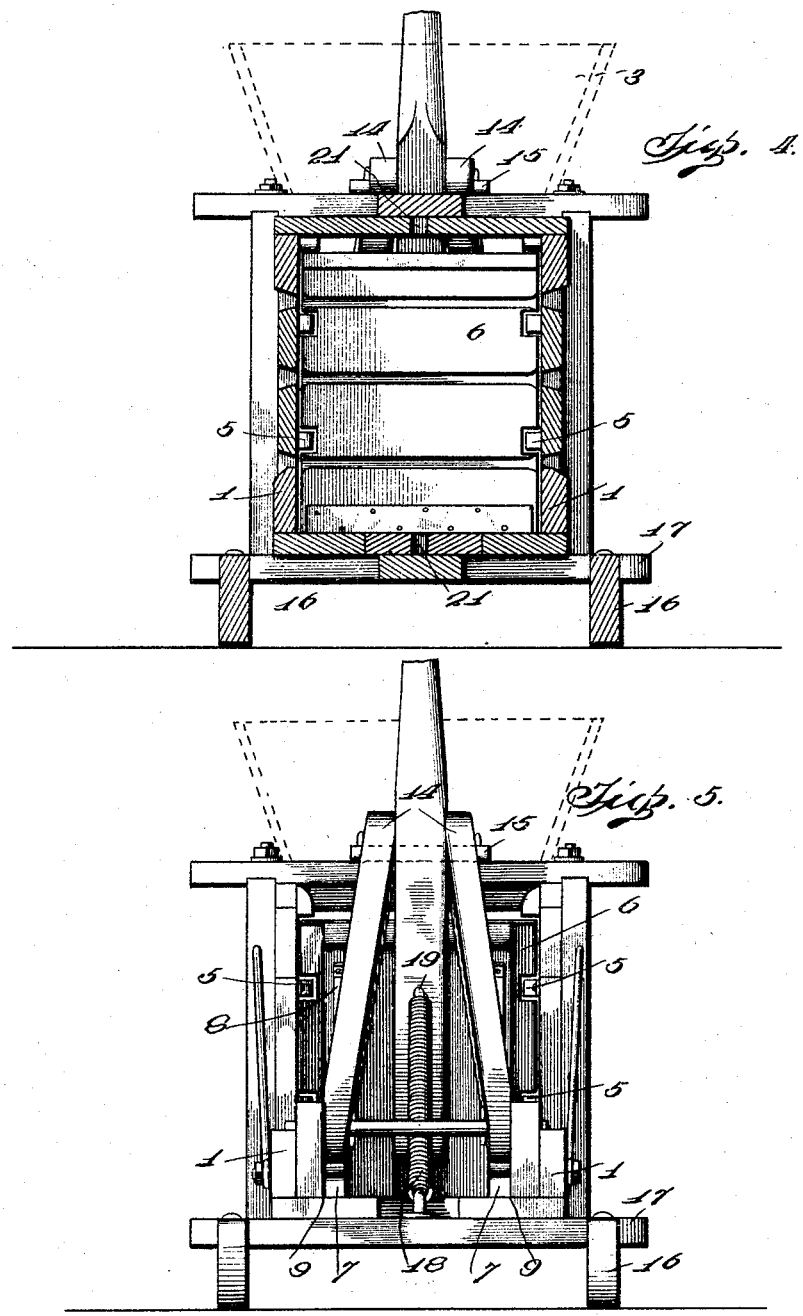

No. 785,642. Patented March 21, 1905.

UNITED STATES PATENT OFFICE.

JOHN J. STOPPLE, OF DALLAS, TEXAS.

BALING-PRESS.

SPECIFICATION forming part of Letters Patent No. 785,642, dated March 21, 1905.

Application filed November 4, 1903. Serial No. 179,833.

*To all whom it may concern:*

Be it known that I, JOHN J. STOPPLE, a citizen of the United States, residing at Dallas, in the county of Dallas and State of Texas, have invented certain new and useful Improvements in Baling-Presses; and I do hereby declare the following to be a full, clear, and exact description of the invention, such as will enable others skilled in the art to which it appertains to make and use the same.

This invention relates to improvements in baling-presses, and particularly to such as are especially adapted to be operated manually.

The object in view is the provision of means for facilitating the forming of smooth even bales with a minimum of labor and in the most expeditious manner.

A further object of the invention is the arrangement of elements in such manner as to obviate danger of clogging or interference from foreign substances.

With these and further objects in view the invention consists in certain novel constructions, combinations, and arrangements of parts, as will be hereinafter fully described and claimed.

In the accompanying drawings, Figure 1 represents a perspective view of a baling-press embodying the features of the present invention. Fig. 2 represents a longitudinal central vertical section through the same. Fig. 3 represents a horizontal section taken on the plane of line 3 3 of Fig. 2, the plunger-operating parts being illustrated in full lines. Fig. 4 represents a transverse vertical section taken on the plane of line 4 4 of Fig. 2. Fig. 5 represents a view in end elevation of the same. Fig. 6 represents an enlarged detail fragmentary view of one of the rear corners of the compression-chamber, illustrating the discharge-aperture therefor. Figs. 7 and 8 represent enlarged detail fragmentary views in top plan and section, respectively, of a modified form of the discharge end of the press. Fig. 9 represents an enlarged detail perspective view of one of the retaining-staples for the end gate illustrated in Figs. 6 and 7.

Referring to the drawings by numerals, 1 indicates a compression-chamber formed in its upper wall with a charge-aperture 2, provided with a feed-hopper 3. Suitable laterally-projecting spring-detents 5 5 are carried by the walls of the compression-chamber 1. Moving within the chamber 1 in the rear of the detents 5 is a plunger 6, carrying at its lower corner a rearwardly-projecting slide 7, forming guides for said plunger. Suitable braces 8 extend from the upper portion of the plunger 6 rearwardly and engage the slides 7 for resisting strain upon the upper edge of plunger 6. Each slide 7 moves in a guideway 9, formed of a horizontal and a vertical plate, and the said guideways are spaced apart and an opening left therebetween for permitting foreign substances to pass between said ways without danger of clogging the operating parts. The vertical wall of each guideway 9 extends into the rear end of the compression-chamber 1 and forms an abutment for limiting the rearward movement of the plunger 6, said walls being beveled, as at 10, and the floor of the chamber 1 being cut away at its rear end for forming a discharge-passage 11 at each lower corner of the rear end of the said chamber for permitting foreign substances or small objects falling in the rear of the plunger 6 to be discharged from the chamber 1 by the return movement of the plunger.

The plunger 6 is operated by a lever 12, pivoted, as at 13, at its lower end to the plunger 6, below the center thereof. The links 14 14 are pivoted, as at 15, to the lever 12 at their upper ends, and at their lower ends are pivoted to the vertical walls or plates of guideways 9, said links thus forming a moving fulcrum for the operating-lever 12. The compression-chamber and operating elements for the plunger are mounted upon suitable runners 16, provided with transverse beams 17, to the rearmost one of which is connected a retractile spring 18, said spring being extended to and connected with the lever 12, as at 19, at a point approximately centrally between the pivots 15 and 13. The spring is attached at the points on the lever 12 specified in order to produce an evenness of return movement of the parts after a stroke, and said spring also serves to maintain the lever 12 in a raised position when not in operation.

A movable block 20 is in operation positioned within the chamber 1, the upper and lower walls of said chamber being provided with longitudinal grooves 21 21, within which travel spurs 22 22, projecting from the edges of block 20 and guiding said block in its movement. At the discharge or front end of the compression-chamber is arranged a drag-pin 23, extending transversely across the lower groove 21 for limiting the lower spur in its movement, and a latch 24 is pivoted, as at 25, to swing vertically and have its locking member normally extend into the upper groove 21, any suitable handle 26 being provided for facilitating swinging the latch 24 upon its pivot.

In operation the material to be baled is fed into hopper 3, the block 20 being positioned as far toward the rear of the compression-chamber as the grooves 21 will admit, which is in approximately the transverse vertical plane of the detents 5. As soon as that portion of the chamber 1 between the plunger 6 and the block 20 is filled the free end of the lever 12 is swung downwardly, which through the action of the links 14 thrusts forwardly the plunger 6, driving before it the charge of material and pressing the same against the block 20, forcing the said block a sufficient distance forwardly for accommodating the somewhat-compressed charge in front of the detents 5, said detents preventing rearward expansion of said charge. A second charge is fed through hopper 3 after the return of the plunger 6, and so on until the entire chamber 1 is filled, whereupon the block 20 is brought to the position indicated in Fig. 2, with its spurs 22 engaging the drag 23 and latch 24. In this position the block 20 will resist any desired amount of pressure for permitting the forming of bales of any preferred compression. The block 20 is provided with grooves for permitting the tying of the bales and formed with a recess for facilitating manual removal. When a bale has been completed, the handle 26 of latch 24 is raised and the block 20 removed and placed in the rear of the bale just completed, and a second bale s formed by repeating the operation just described, the new bale forcing the old bale forwardly and discharging the same out of the compression-chamber. It will be observed that if any small sticks or foreign particles should fall back of the plunger 6 the same would pass down between the guideways 9 and leave the parts free for operation or be discharged through openings 11 upon the return stroke of the plunger 6.

In Figs. 7 and 8 I have illustrated a modified construction, which consists of a gate adapted to be employed as a substitute for the block 20. The upper wall of the compression-chamber when employing the modified form of construction is provided with a locking-hook 27, pivoted, as at 28, and provided with an operating-handle 29, said hook in operation being adapted to receive and lock in position a bail 30, carried by the upper end of a standard 31, fixed to a gate 32, closing the discharge end of the compression-chamber. Suitable staples 33 are secured in the base or bottom floor of the compression-chamber and project rearwardly therefrom for receiving locking-pins 34, projecting downwardly from the gate 32, whereby said door may be retained fixedly in position during a baling operation and may be released simply by swinging the handle 29 upwardly, swinging the upper edge of the gate 32 rearwardly, and lifting the pins 34 out of staples 33. When this modified construction is employed, the charges of material are pressed into the compression-chamber until said chamber is filled and the desired degree of compression maintained, when the bale is tied and the gate 32 removed.

Having thus fully described my invention, what I claim as new, and desire to secure by Letters Patent, is—

1. In a baling-press, the combination with a compression-chamber and a plunger therefor, of rearwardly-projecting guides connected to the same, guideways limiting said guides against lateral play, one of the walls of each of said guideways constituting an abutment for limiting said plunger in its rearward movement, a discharge-opening being formed between the base of said chamber and the end of each guideway, and means for reciprocating said plunger.

2. In a baling-press, the combination with a compression-chamber and a plunger therefor, of guides projecting rearwardly from said plunger, guideways limiting said guides against lateral play and extending into said chamber, the ends of said guideways within the chamber being cut away and an aperture being formed between the said end of each guideway and the bottom of said chamber, and means for reciprocating said plunger.

3. In a baling-press, the combination with a compression-chamber formed with longitudinal grooves in its walls, a plunger for said chamber, and means for reciprocating the same, of a movable block within said chamber, spurs projecting from said block into said grooves, and means for engaging said spurs for retaining the block against movement.

4. In a baling-press, the combination with a compression-chamber formed with grooves in its walls, a plunger for said chamber, and means for reciprocating the same, of a block within said chamber, spurs projecting from said block into said grooves, means within one of said grooves for limiting one of said spurs against movement, and movably-mounted means within another of said grooves for limiting another of said spurs against movement.

5. In a baling-press, the combination with a compression-chamber formed with a longitudinal groove in each of its upper and lower walls, a plunger for said chamber, and means for reciprocating the same, of a block within said chamber, a spur projecting from said block into each of said grooves, a drag-pin extending transversely of one of said grooves, a pivotally-mounted latch normally extending into the other of said grooves, and means projecting beyond the wall of said chamber for facilitating removing said latch from said groove.

In testimony whereof I hereunto affix my signature in presence of two witnesses.

JOHN J. STOPPLE.

Witnesses:
 W. W. STOPPLE,
 M. L. ROBERTSON.